(12) United States Patent
Jaśkiewicz et al.

(10) Patent No.: US 10,794,502 B2
(45) Date of Patent: Oct. 6, 2020

(54) CHECK VALVES

(71) Applicant: HS Wroclaw Sp. z o.o., Wroclaw (PL)

(72) Inventors: Zbigniew Jaśkiewicz, Wroclaw (PL); Jaroslaw Dabrowski, Bialystok (PL)

(73) Assignees: HS WROCLAW SP. Z O.O., Wroclaw (PL); HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/014,286

(22) Filed: Jun. 21, 2018

(65) Prior Publication Data

US 2018/0372233 A1    Dec. 27, 2018

(30) Foreign Application Priority Data

Jun. 21, 2017 (EP) .................................. 17461551

(51) Int. Cl.
*F16K 15/03* (2006.01)
*F16K 15/02* (2006.01)
*F16K 47/02* (2006.01)

(52) U.S. Cl.
CPC ............ *F16K 15/023* (2013.01); *F16K 15/03* (2013.01); *F16K 47/023* (2013.01); *Y10T 137/7898* (2015.04)

(58) Field of Classification Search
CPC ...... F16K 15/023; F16K 15/03; F16K 15/033; Y10T 137/7898–7903
USPC ........................................................ 251/337
See application file for complete search history.

(56) References Cited

U.S. PATENT DOCUMENTS

| 2,454,072 | A | * | 11/1948 | Long | F16K 15/03 |
| | | | | | 137/515.3 |
| 2,742,921 | A | * | 4/1956 | Dove | F02K 9/52 |
| | | | | | 137/516.27 |
| 5,146,949 | A | * | 9/1992 | Retzloff | F16K 15/033 |
| | | | | | 137/527 |

(Continued)

FOREIGN PATENT DOCUMENTS

| CN | 87202049 U | 10/1987 |
| CN | 201273387 Y | 7/2009 |

(Continued)

OTHER PUBLICATIONS

Extended European Search Report for International Application No. 17461551.8 dated Jan. 12, 2018, 6 pages.

*Primary Examiner* — Kevin F Murphy
(74) *Attorney, Agent, or Firm* — Cantor Colburn LLP

(57) ABSTRACT

A check valve comprises a valve housing defining a valve opening; and a flapper element. The flapper element has a proximal end, and is pivotally mounted to the valve housing adjacent the periphery of the valve opening at its proximal end for pivotal movement between a closed position, in which it blocks the flow of fluid through the valve opening and a fully open position in which it permits the flow of fluid through the valve opening. At least one spring damping element is located between the flapper element and the valve housing for providing a damping force resisting the pivotal movement of the flapper element towards its open position. The at least one spring damping element being operable to produce a damping force only over a final range of the pivotal movement of the flapper element as it approaches its fully open position.

16 Claims, 6 Drawing Sheets

(56) References Cited

U.S. PATENT DOCUMENTS

| | | | | |
|---|---|---|---|---|
| 5,341,840 A | * | 8/1994 | Manson | ............... F16K 15/03 |
| | | | | 137/527.8 |
| 7,152,622 B2 | * | 12/2006 | Scaramucci | ......... F16K 15/033 |
| | | | | 137/527.2 |
| 8,317,158 B2 | | 11/2012 | Patterson et al. | |
| 8,534,314 B2 | * | 9/2013 | Zellweger | ............... A62C 4/02 |
| | | | | 137/460 |
| 8,887,757 B2 | * | 11/2014 | Moren | ................. F16K 15/03 |
| | | | | 137/515.7 |
| 9,982,793 B2 | * | 5/2018 | Thomas | ............... B23P 15/002 |

FOREIGN PATENT DOCUMENTS

| | | |
|---|---|---|
| CN | 105042124 A | 11/2015 |
| CN | 205371726 U | 7/2016 |
| CN | 205388173 U | 7/2016 |

\* cited by examiner

CHECK VALVES

This application claims priority to European Patent Application No. 17461551.8 filed Jun. 21, 2017, the entire contents of which is incorporated herein by reference.

TECHNICAL FIELD

The present disclosure relates to check valves.

BACKGROUND

It is known to use check valves to allow fluid flow in one direction therethrough, and to prevent flow in the opposite direction. Check valves are widely used in a wide variety of applications, for example in air conditioning systems, for example in aircraft air conditioning systems.

One form of check valve includes a pair of hinged flappers that pivot open in the direction of fluid flow when the fluid pressure differential exceeds a predetermined valve "cracking pressure". If a negative pressure differential exists across the valve, the flapper elements close, preventing flow reversal.

Another form of check valve includes just a single flapper element which opens and closes depending on the pressure differential across the valve.

The present disclosure relates to a check valve of the latter type.

SUMMARY

The present disclosure provides a check valve. The check valve comprises a valve housing defining a valve opening and a flapper element having a proximal end. The flapper element is pivotally mounted to the valve housing adjacent the periphery of the valve opening at its proximal end for pivotal movement between a closed position, in which it blocks the flow of fluid through the valve opening and a fully open position in which it permits the flow of fluid through the valve opening. The check valve further comprises at least one spring damping element located between the flapper element and the valve housing for providing a damping force resisting the pivotal movement of the flapper element towards its open position The at least one spring damping element is operable to produce a damping force only over a final range of the pivotal movement of the flapper element as it approaches its fully open position.

The spring damping element may be is operable to produce a damping force only in the final 45° of pivotal movement of the flapper element towards its fully open position, for example only in the final 30° or final 20° of pivotal movement of the flapper element towards its fully open position.

The check valve may comprise a plurality of spring damping elements which are operable successively to increase the damping force as the flapper element approaches its fully open position.

The proximal end of the flapper element and the valve housing may comprise surfaces arranged opposed to one another in the fully open position of the flapper element, the at least one spring damping element projecting from one or other of the opposed surfaces when the flapper element is in its closed position and engaging an associated opposed surface as the flapper element moves towards its open position.

A flapper element surface may be arranged generally perpendicularly to the plane of the flapper element and an associated opposed valve housing surface may be arranged generally parallel to the plane of the valve opening. A first spring damping element may extending from one of those surfaces.

A first spring damping element may extend from the valve housing surface.

The check valve may comprising a pair of valve housing surfaces arranged on opposed sides of a centreline of the valve housing, with respective first spring damping elements extending from the respective valve housing surfaces.

The valve housing surface may is formed as a shoulder in or adjacent a mounting post for the flapper element.

The flapper element may comprise a proximal extension, with an opposed surface being provided on the extension and the valve housing may comprise an associated valve housing surface. One or more second spring damping elements may project from one or other of the surfaces.

In embodiments, the second spring damping element projects from the valve housing surface.

The check valve may comprise the first and second spring damping elements and wherein the second spring damping element may be is operable before the first spring damping element as the flapper element approaches its fully open position.

One or more pairs of the opposed surfaces provided on the flapper element and the valve housing may be stop surfaces, coming into contact with one another when the flapper element is in its open position.

The spring damping element may comprises a bumper element at a distal end thereof for engagement with the flapper element or valve housing.

The bumper element may be is slidably mounted in a bore of the valve housing or flapper element.

A distal end of the bumper element may be rounded.

The flapper element may be curved in a plane perpendicular to its longitudinal centreline and the valve opening may be is provided with a raised lip having a profile complementary to the periphery of the flapper element for sealing engagement therewith.

The valve opening may be generally circular in shape.

The flapper element may comprise one or more reinforcing ribs formed therein.

The reinforcing ribs may comprise a central longitudinal rib, with additional ribs extending therefrom.

BRIEF DESCRIPTION OF DRAWINGS

An embodiment of check valve in accordance with the disclosure will now be described by way of example only with reference to the accompanying drawings in which.

DETAILED DESCRIPTION

Figure 1:
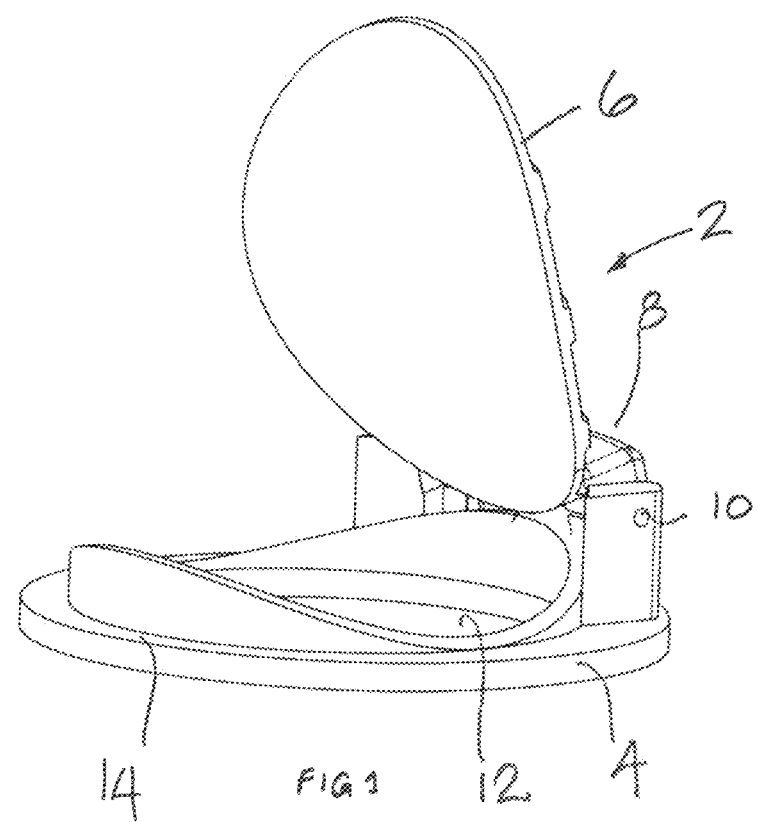
FIG. 1 shows a perspective view of a check valve in a fully open position.

With reference to FIG. 1, a check valve 2 comprises a valve housing 4 and a single flapper element 6 pivotally mounted to the valve housing 4 at a proximal end 8 of the flapper element 6 through a hinge pin 10. In this embodiment, the valve housing 4 is generally annular in shape, defining a generally circular valve opening 12 surrounded by a generally annular flange 14. In use, the annular flange 14 will be suitably supported in a pipe or duct through which a fluid, for example a gas such as air flows. In alternative embodiments, the annular flange 14 may be integrally formed with a portion of the duct. The disclosure is not, limited to circular-shaped housings 4 and other housing shapes may be used.

Figure 5:
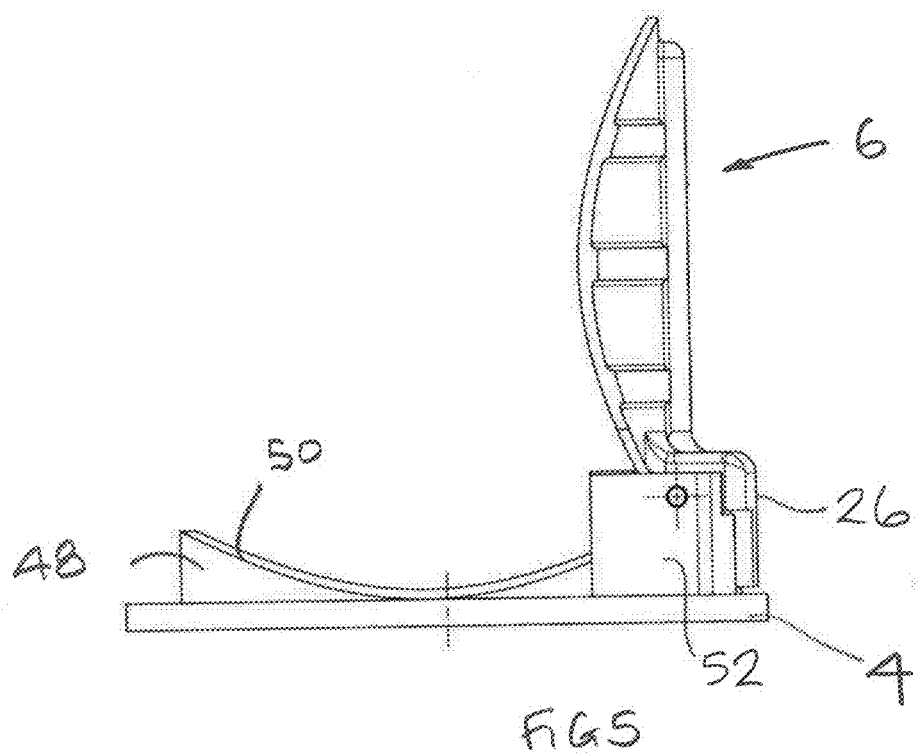
FIG. 5 shows a side view of the check valve of FIG. 1 in the open position.
Figure 6:
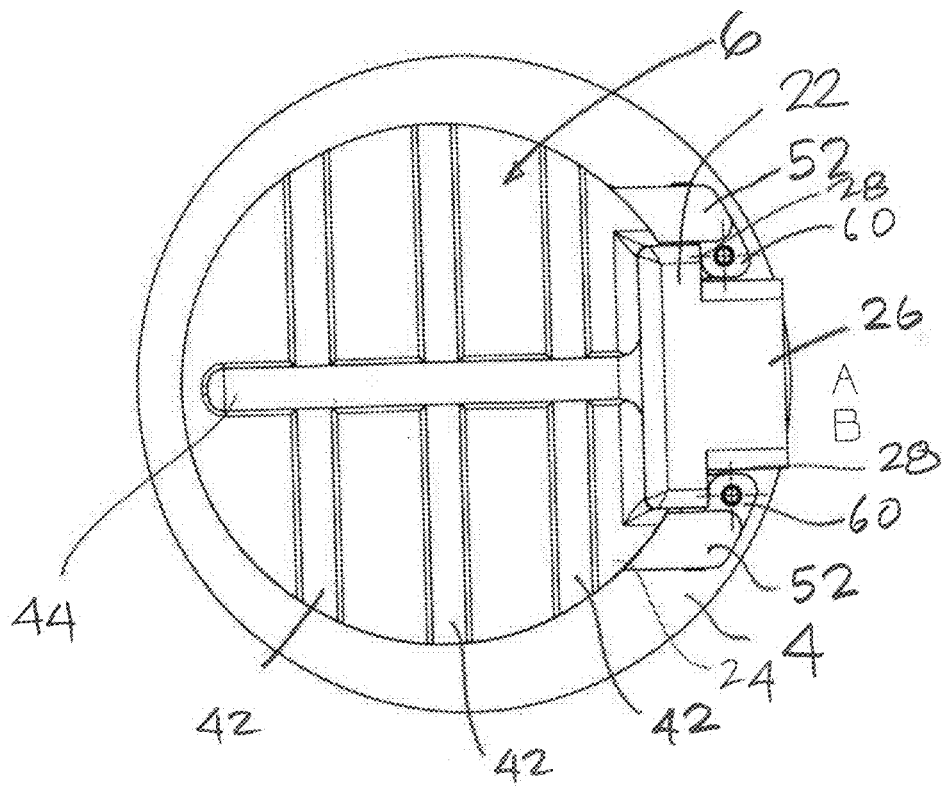
FIG. 6 shows a top plan view of the check valve of FIG. 1 in the closed position.
Figure 8:
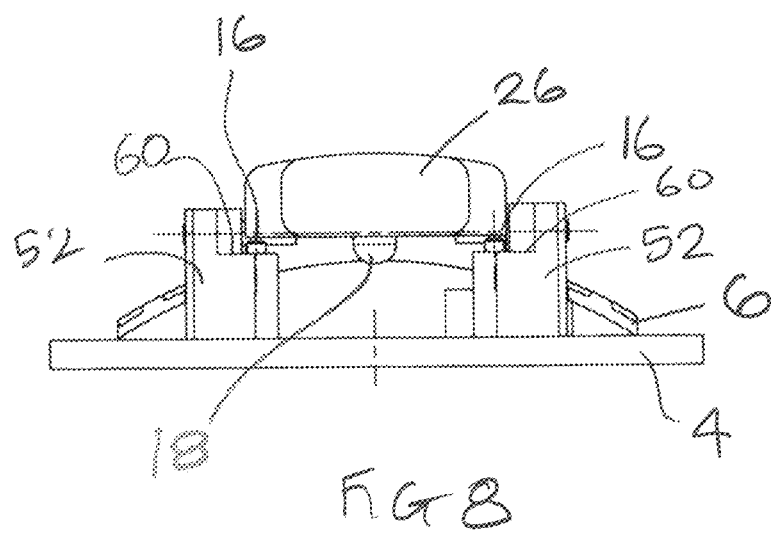
FIG. 8 shows a rear view of the check valve of FIG. 1 in the closed position.

The flapper element 6 is pivotally mounted for rotation between a closed position shown for example in FIG. 8 and a fully opened position shown for example in FIGS. 1 and 5. In the closed position, the flapper element 6 blocks the flow of fluid through the valve opening 12. In the fully open position, and in intermediate positions, the flapper element 6 allows fluid to flow through the valve opening 12.

As will be described further below, a pair of first spring damping elements 16, and a second spring damping element 18 are arranged between the flapper element 6 and the valve housing 4 to damp the impact of the flapper element 6 on the valve housing 4 as it moves to its fully open position. As will also be described, the first and second spring damping elements 16, 18 are only operable to produce a damping force in a final range of pivotal movement of the flapper element 6 as it approaches its fully open position.

Figure 10:
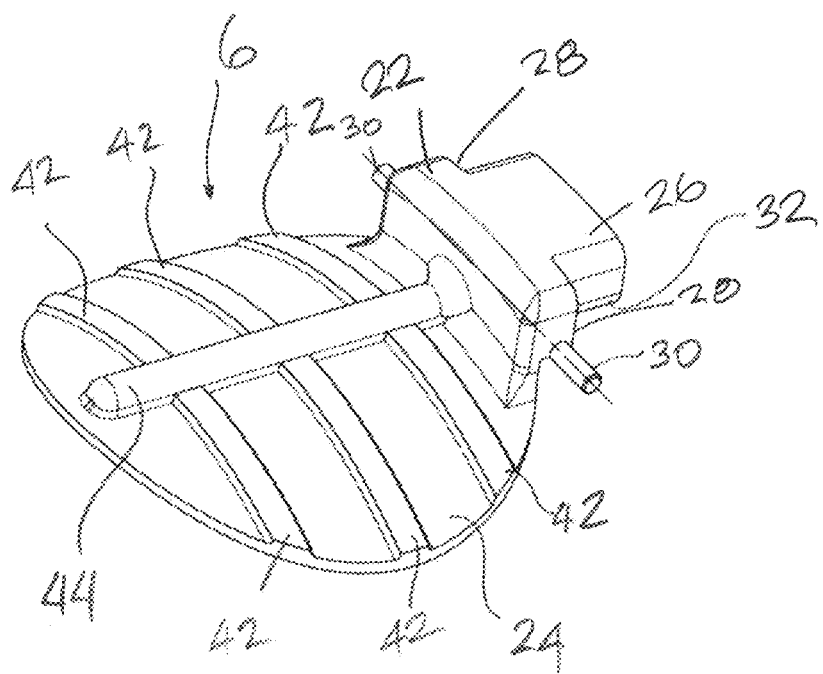
FIG. 10 shows a perspective view of the flapper element of the check valve of FIG. 1.

As can be seen in FIG. 1 and FIG. 10 for example, the flapper element 6 comprises a flapper body 20 which, when viewed from above or below, is circular in shape for closing the valve opening 12. The particular shape of the flapper body 20 will be determined by the shape of the valve opening 12 and is not limited to a circular shape. The flapper element 6 is generally symmetrical about its longitudinal centreline A.

Figure 4:
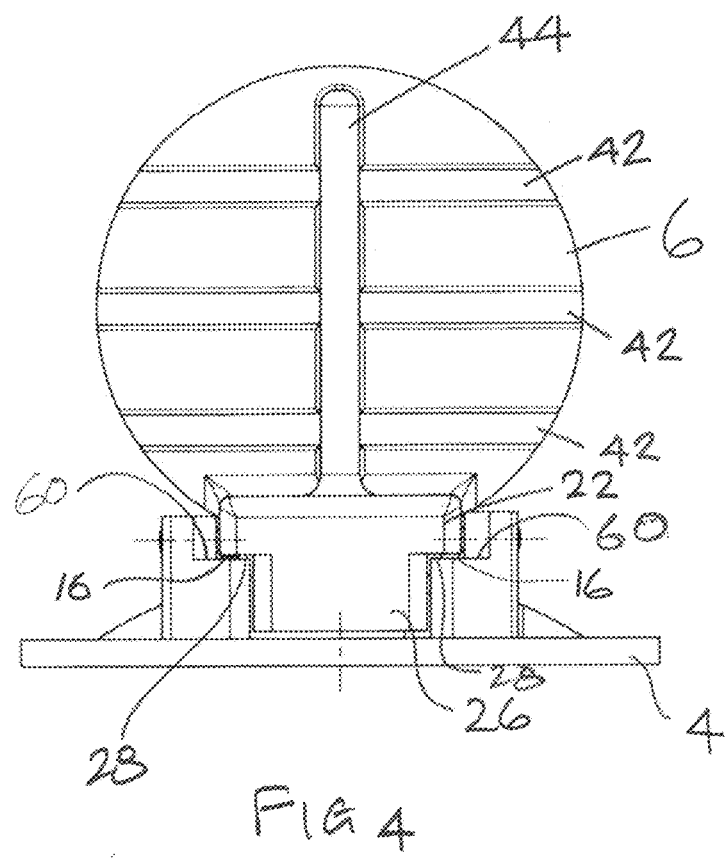
FIG. 4 shows a rear view of the check valve of FIG. 1 in the open position.

The flapper element 6 comprises a proximal end 8 by which it is mounted to the valve housing 4. In this embodiment, the proximal end 8 comprises a mounting portion 22 extending upwardly from the upper surface 24 of the flapper body 20 and a proximal extension 26 extending away from the mounting portion 22 axially relative to the flapper element's centreline A. As can be seen, for example in FIGS. 4, 8 and 10, respective surfaces 28 are formed on the rearward surface of the mounting portion 22 on either side of the proximal extension 26. These surfaces 28 will oppose corresponding surfaces 60 in the valve housing 4 when the flapper element 6 is in the fully open position. The surfaces 28 face rearwardly, i.e. away from the flapper body 20. In this particular embodiment they are arranged generally perpendicular to the plane of the flapper element 6.

In this embodiment, the surface 28 is generally perpendicular to the plane of the valve housing 4 when the flapper element is in the closed position. The mounting portion 22 further comprises a pair of hinge pins 30 projecting laterally therefrom in a direction generally perpendicular to the flapper element centreline A. The hinge pins 30 may be formed integrally with the flapper element 6 or formed as separate elements and suitably mounted to the mounting portion 22. In one example, the hinge pins 30 may be formed as end portions of an elongate pin projecting from both sides of the mounting portion 22. The hinge pins 30 may, for example, be insert moulded or insert cast into the flapper element 6 during manufacture of the flapper element 6. In yet further embodiment, the mounting portion 22 may be provided with a bore extending therethrough which pivotally receives a hinge pin 30. In a yet further arrangement, the hinge pin 30 may be provided with a flange and bolted or otherwise fastened to the flapper element 6.

Figure 2:
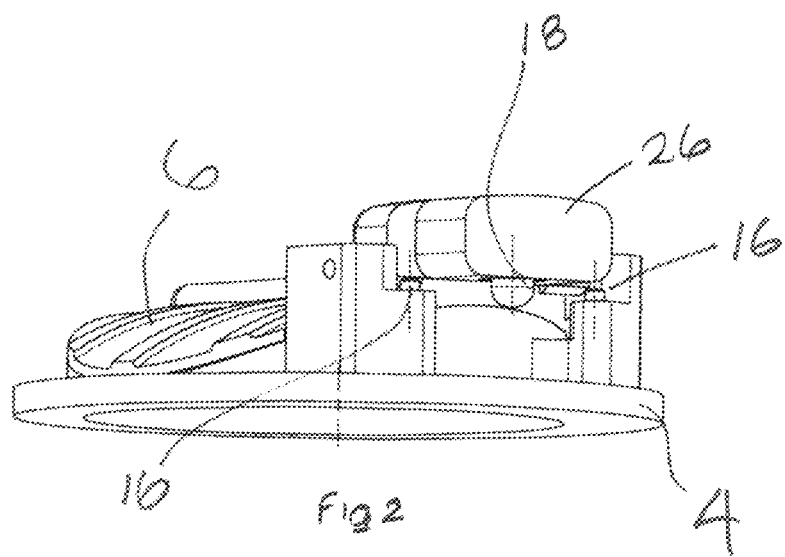
FIG. 2 shows a perspective view of the check valve of FIG. 1 in a closed position.
Figure 3:
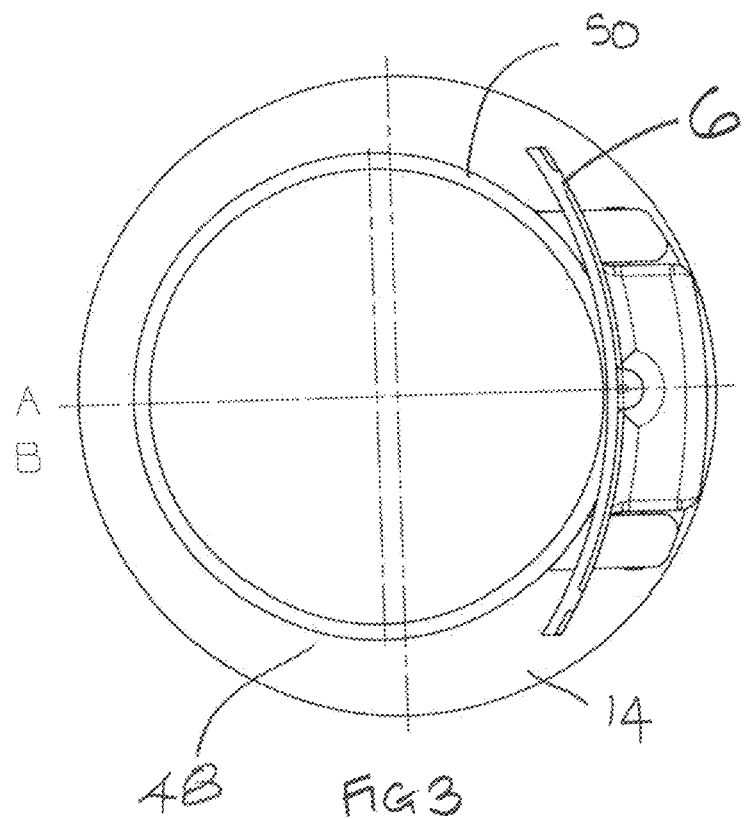
FIG. 3 shows a top plan view of the check valve of FIG. 1 in the open position.
Figure 12:
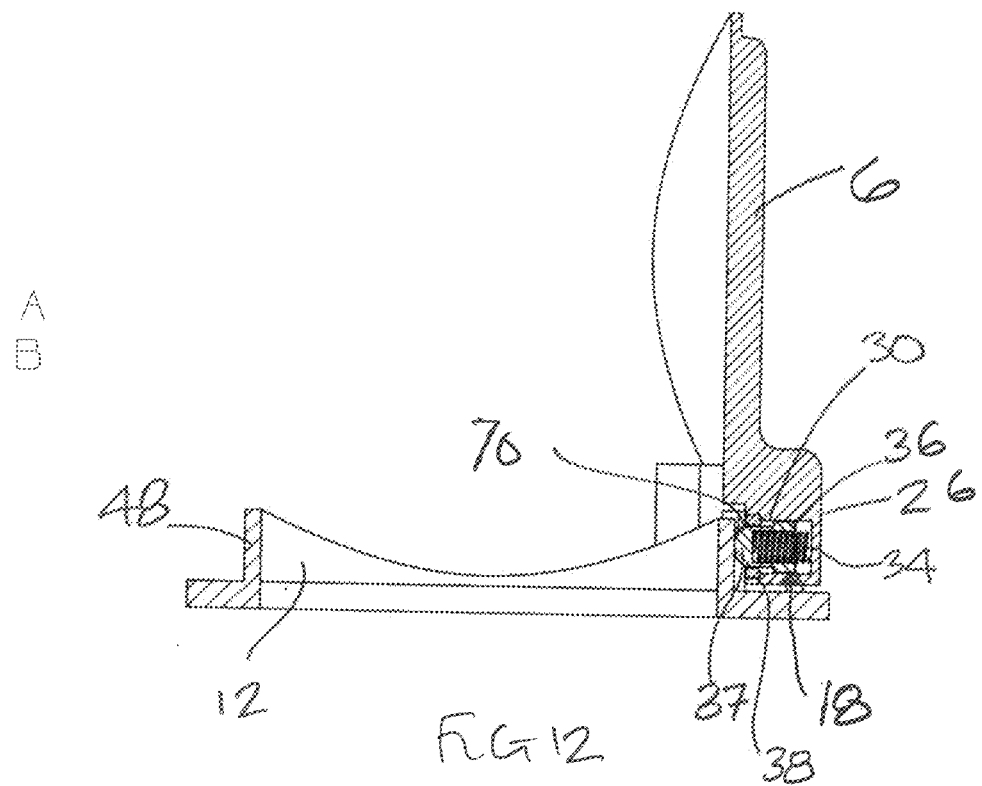
FIG. 12 shows a cross-sectional view along line B-B of FIG. 3.

The proximal extension 26 is provided with a bore 30 in its downwardly facing stop surface 32 for receiving the second spring damping element 18. As illustrated in FIG. 12, the second spring damping element 18 comprises a spring element 34, for example a coil spring, and a bumper element 36 which is slidably received in the bore 30. The spring element 34 and bumper element 36 are retained in the bore 30 by means of a fastening ring 38 which may, for example, be threadedly mounted in the mouth of the bore 30. The bumper element 36 comprises a shoulder 40 which engages the fastening ring 38 when the bumper element 36 is biased fully outwardly of the bore 30 by the spring element 34, as shown in FIG. 2. Of course, the spring element 34 and bumper element 36 may be retained in the bore 30 by any suitable manner. The amount by which the bumper element 36 projects from the surface 32 may be determined by appropriate sizing and/or positioning of the fastening ring 38 for example. As will be described further below, and as can be seen from FIG. 12, when the flapper element 6 moves to its closed position, the bumper element 36 will move into contact with a stop surface 70 of a raised lip 48 of the valve housing 4. The distal end 37 of the bumper element 36 may be rounded, as illustrated, to facilitate engagement with the opposed surface 70 of the valve housing 4.

As can further be seen from FIG. 10, for example, the body 20 of the flapper element 6 is curved about its centreline A in a direction towards the valve opening 12. Thus the flapper element 6 is arcuate, for example circularly arcuate, in a plane perpendicular to the centreline A. As will be described further below, this curvature may provide certain advantages. The flapper body 20 is also provided with one or more strengthening ribs 42 which extend along the upper surface 24 of the flapper body 20 in a direction generally perpendicular to the centreline A of the flapper body 20. In this embodiment, the ribs 42 extend from a central, axially extending rib 44 which extends generally parallel to the centreline A of the flapper body 20 from the mounting portion 22 of the flapper element 6. In this embodiment, the dimensions, for example the axial length of the central rib 44 may be chosen to provide an appropriate mass and thus moment of inertia for the flapper element 6. Thus, for example, the central rib 44 may, as illustrated, extend only over a proportion of the axial dimensional of the flapper element 6. In other embodiments, the central rib 44 may be simply replaced by a suitable point mass. Of course the shape, number and spatial arrangement of the strengthening ribs 42 may differ from that illustrated.

Figure 9:
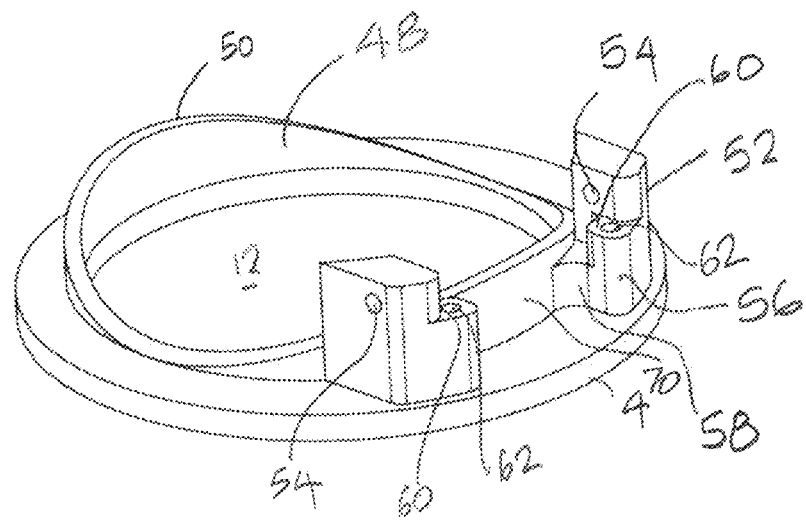
FIG. 9 shows a perspective view of the valve housing of the check valve of FIG. 1.

Turning now to the valve housing 4, it can be seen, for example from FIG. 9, that the valve opening 12 is surrounded by a raised lip 48 having a sealing surface 50. The shape of the sealing surface 50 is complementary to the shape of the periphery of the flapper body 20 so as to provide a seal between the two when the flapper element 6 is in the closed position. Thus, as can be seen in FIG. 5 for example, the sealing surface 50 slopes downwardly and outwardly relative to the valve opening 12.

As discussed above, the flapper element 6 is pivotally mounted to the valve housing 4 by one or more hinge pins 30. The valve housing 4 comprises a pair of mounting posts 52 extending upwardly from the annular flange 14 of the valve housing 4. As illustrated in FIG. 9, for example, the mounting posts 52 extend beyond the raised lip 48 surrounding the valve opening 12. Each mounting post 52 comprises a bore 54 which receives the hinge pin(s) 30 of the flapper element 6. As discussed above, the hinge pins 30 may be rotatably received within the mounting bores 54 or rotationally fixed with respect thereto, in which case, the flapper element 6 will pivot around the hinge pin 30.

For strength purposes, in this embodiment, the mounting post 52 is formed contiguously with the raised lip 48. However, that is not essential and it may be formed spaced therefrom. The mounting post 52 is further provided with a laterally inwardly extending portion 56, in this embodiment a shoulder, which, for strength purposes, is connected to the lip 48 by a web of material 58. Of course the portion 56 may be separate from the mounting post 52 and/or the raised lip 48. An upwardly facing surface 60 is formed on the upper end of each stop portion 56. In this embodiment, the surface 60 is generally parallel to the plane of the valve opening 12.

Figure 11:
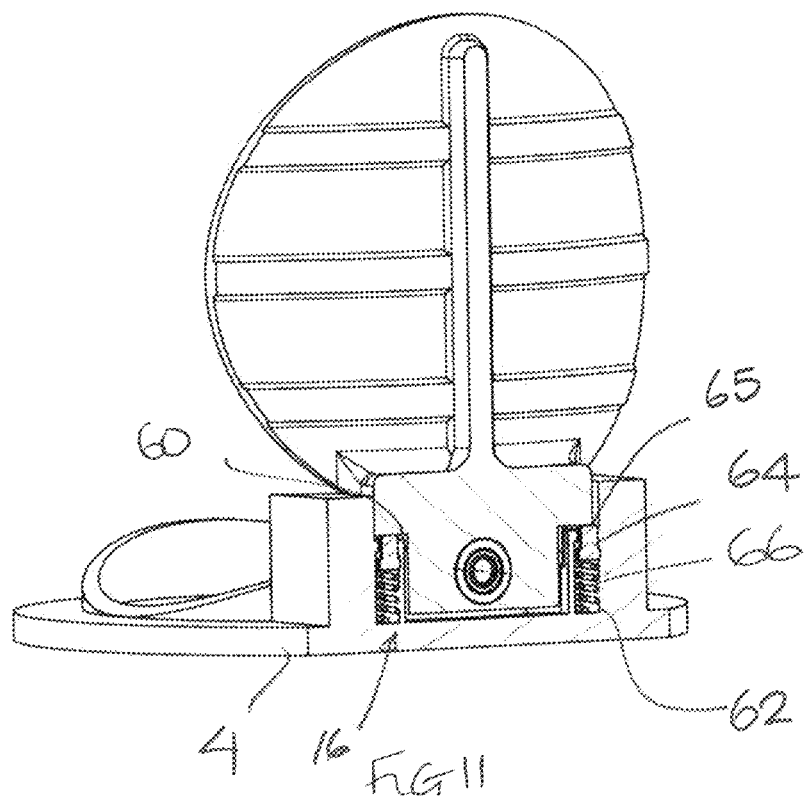
FIG. 11 shows an cross-sectional view along line A-A of FIG. 3.

Each portion 56 is also provided with a bore 62 extending from the surface 60. As can be seen in FIG. 11 for example, the bore 62 receives a first spring damping element 16. The spring damping element 16 is similar in construction to the second spring damping element 18 mounted in the flapper element 6, having a bumper element 64 which is spring biased out of the bore 62 by a spring element 66, for example a coil spring as shown. The bumper element 64 and spring element 66 may be retained in the bore 62 in a similar manner to the first spring damping element 16 for example, or in any suitable manner. Also, the amount by which the bumper element 64 projects from the bore 62 may be set in a similar manner to that described above or some other suitable manner. Also, a distal end 65 of the bumper element 36 may be rounded, as illustrated.

Operation of the check valve 2 will now be described.

Figure 7:
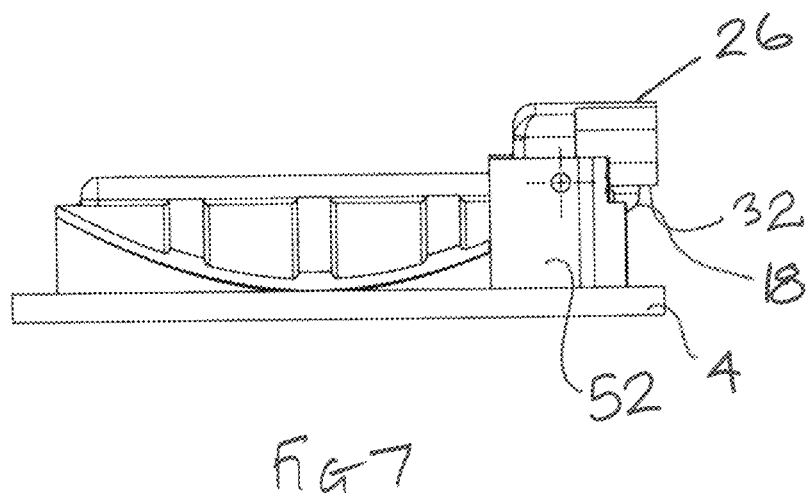
FIG. 7 shows a side view of the check valve of FIG. 1 in the closed position.

As can be seen in FIGS. 7 and 8, when the flapper element 6 is in its closed position, the second damping element 18 projects downwardly from the surface 32 of the proximal extension 28 of the flapper elements 6. Also, the first spring damping elements 16 project upwardly from the surfaces 60 of the valve housing 4. In this position there is no contact between the spring damping elements 16, 18 and their opposed surfaces. As the flapper element 6 rotates from its closed position towards its fully open position, the second damping element 18 first moves into contact with the stop surface portion 70 of the raised lip 48 of the valve housing 4 between the mounting posts 50. The precise rotational position at which the second damping element 18 contacts the raised lip 48 can be determined by the amount by which the second damping element 18, more precisely its bumper element 34 projects from the surface 28. The particular rotational angle at which contact is made between the bumper element 38 and the surface 28 can be chosen to provide the desired opening and damping characteristics. Typically, however, this contact may occur once the flapper element 6 has rotated to within 45°, for example within 30° or 20° of its fully closed position. The second damping element 18 thus begins to provide a damping force which begins to damp the movement of the flapper element 6. It will be appreciated that as there is no damping over the initial range of pivotal movement of the flapper element 6, the flapper element 6 is able to open quickly.

As the flapper elements 6 continues to rotate, the first spring damping elements 16 will contact the surfaces 28 of the flapper element 6. This increases the damping force on the flapper element 6 as it moves to its fully open position. Again the precise position at which the first spring damping elements 16 become effective can be determined by the amount they project from the stop surface 60 and can be chosen to provide the desired opening and damping characteristics.

The spring damping elements 16, 18 therefore become effective sequentially, allowing the damping effect to be varied as the flapper element rotates.

In this embodiment, the springs 66 of the first spring damping elements 16 have a higher spring constant than the springs 32 of the second spring damping element 18 such that they contribute the largest amount of damping force. The second spring damping element 18 thus provides preliminary, relatively low damping. However, the relative spring constants may be chosen to give the desired damping profile.

In its fully open position, stop surfaces of the flapper element 6 and the valve housing 4 come into contact and the valve 2 is maintained open by means of the pressure differential across the valve 2. In the embodiment described, the downwardly facing surface 32 of the flapper element proximal extension 26 and the surface portion 70 of the lip 48 of the valve housing 4 form stop surfaces. However, it is also possible that in addition or alternatively the surfaces 28 of the flapper valve mounting portion 22 and surfaces 60 of the valve housing 4 may provide stop surfaces.

When the pressure differential across the check valve 2 changes such that the check valve 2 will close, the flapper element 6 will biased towards the closed position by the first and second spring damping elements 16, 18 thereby assisting in a rapid closing of the check valve 2.

As the check valve moves to its closed position, the periphery of the flapper body 20 will move into engagement with the sealing surface 50 of the valve housing lip 48. The curved form of the flapper body 20 may be advantageous in this regard in that it will allow the flapper body 20 to flex, thereby damping the impact of the flapper body 20 with the sealing surface 50.

Whilst the embodiment described above has two sets of spring damping elements 16, 18, it will be appreciated that the check valve 2 may be provided with just one set of spring damping elements 16, 18. For example, in certain embodiments, the second spring damping element 18 may be omitted. In others, the first spring damping elements 16 may be omitted or their number varied. It may be that the first spring damping elements 16 are particularly advantageous, as the valve housing 4 may provide a larger mass of material in which to mount the first spring damping elements 16.

As discussed above, it will be seen that damping of the flapper element 6 only occurs as the flapper element 6 approaches its fully open position. This allows rapid initial opening of the check valve 2. At the same time the spring force applied by the spring damping elements 16, 18 acts to provide a closing force to the flapper element 6, also assisting rapid closure of the valve 2.

The curved shape of the flapper body 20 in this embodiment may also be advantageous, not only for the damping effect upon closure, but also as it will mitigate the possibility of the flapper element 6 interfering with the duct in which the check valve 2 is placed. Also, as illustrated in FIG. 2, the curved shape maximises the open flow area through the valve opening 12, thereby reducing pressure losses through the check valve 2.

The described embodiment provides a check valve 2 in which impact forces between the flapper element 6 and the valve housing 4 are reduced due to the spring damping elements 16, 18. This may reduce impact damage, particularly on the flapper element 6, thereby leading to improved operational life of the check valve 2.

The invention claimed is:

1. A check valve comprising:
a valve housing defining a valve opening; and
a flapper element having a proximal end, the flapper element being pivotally mounted to the valve housing adjacent the periphery of the valve opening at its proximal end for pivotal movement between a closed position, in which it blocks the flow of fluid through the valve opening and a fully open position in which it permits the flow of fluid through the valve opening;
at least one spring damping element comprising a plurality of springs located between the flapper element and the valve housing for providing a damping force resisting the pivotal movement of the flapper element towards its open position, the at least one spring damping element being operable to produce a damping force only over a final range of the pivotal movement of the flapper element as it approaches its fully open position;
wherein respective springs of the plurality of springs are sequentially operable to contact respective opposed surfaces successively to increase the damping force as the flapper element approaches its fully open position,
wherein the proximal end of the flapper element comprises a flapper element surface and the valve housing comprises a valve housing surface, the flapper element surface and the valve housing surfaces arranged opposed to one another in the fully open position of the flapper element, the at least one spring damping element projecting from one or other of the opposed surfaces when the flapper element is in its closed position, the at least one spring damping element engaging the other of the opposed surfaces as the flapper element moves towards its open position, and
wherein the flapper element surface is arranged generally perpendicularly to a plane of the flapper element and the valve housing surface is arranged generally parallel to a plane of the valve opening, a first spring of the plurality of springs extending from one of the flapper element surface and the valve housing surface.

2. A check valve as claimed in claim 1, wherein the spring damping element is operable to produce a damping force only in the final 45° of pivotal movement of the flapper element towards its fully open position.

3. A check valve as claimed in claim 1, wherein the first spring extends from the valve housing surface.

4. A check valve as claimed in claim 3, wherein the valve housing surface is formed on, in or adjacent a mounting post for the flapper element.

5. A check valve as claimed in claim 3, comprising a further valve housing surface, the valve housing surface and the further valve housing surface arranged on opposed sides of a centreline (A) of the valve housing, another first spring of the plurality of springs extending from the further valve housing surface.

6. A check valve as claimed in claim 1, wherein the flapper element comprises a proximal extension, the flapper element surface being provided on said extension, one or more second springs of the plurality of springs projecting from one or other of the flapper element surface and valve housing surface.

7. A check valve as claimed in claim 6, wherein the one or more second springs project from the valve housing surface.

8. A check valve as claimed in claim 6, wherein the one or more second springs are operable before a first spring of the plurality of springs as the flapper element approaches its fully open position.

9. A check valve as claimed in claim 1, wherein the opposed flapper element surface and valve housing surface are stop surfaces, coming into contact with one another when the flapper element is in its open position.

10. A check valve as claimed in claim 1, wherein the at least one spring damping element comprises a bumper element at a distal end thereof for engagement with the flapper element or valve housing.

11. A check valve as claimed in claim 10, wherein the bumper element is slidably mounted in a bore of the valve housing or flapper element.

12. A check valve as claimed in claim 10, wherein a distal end of the bumper element is rounded.

13. A check valve as claimed in claim 1, the flapper element is curved in a plane perpendicular to its longitudinal centreline (A) and the valve opening is provided with a raised lip having a profile complementary to the periphery of the flapper element for sealing engagement therewith.

14. A check valve as claimed in claim 13, wherein the valve opening is generally circular in shape.

15. A check valve as claimed in claim 1, wherein the flapper element comprises one or more reinforcing ribs formed therein.

16. A check valve as claimed in claim 1, wherein the plurality of springs is operable to produce a damping force only in the final 30° or final 20° of pivotal movement of the flapper element towards its fully open position.

* * * * *